US 6,657,956 B1

(12) United States Patent
Sigaud (10) Patent No.: US 6,657,956 B1
(45) Date of Patent: Dec. 2, 2003

(54) METHOD ENABLING SECURE ACCESS BY A STATION TO AT LEAST ONE SERVER, AND DEVICE USING SAME

(75) Inventor: Alain Sigaud, Elancourt (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 08/930,122

(22) PCT Filed: Mar. 3, 1997

(86) PCT No.: PCT/FR97/00371

§ 371 (c)(1),
(2), (4) Date: Nov. 5, 1997

(87) PCT Pub. No.: WO97/33415

PCT Pub. Date: Sep. 12, 1997

(30) Foreign Application Priority Data

Mar. 7, 1996 (FR) ............................................. 96 02901

(51) Int. Cl.⁷ .............................................. H04L 12/28
(52) U.S. Cl. ........................ 370/230; 370/401; 709/228; 713/151
(58) Field of Search ................................ 370/230, 231, 370/235, 401, 402; 380/4, 25, 50; 709/201, 202, 203, 228, 229; 713/150, 151, 153, 159, 161

(56) References Cited

U.S. PATENT DOCUMENTS 5,276,735 A  *  1/1994  Boebert et al. ............... 380/25
5,416,842 A  *  5/1995  Aziz ............................... 380/4
5,577,209 A  * 11/1996  Boyle et al. ................. 709/230
5,583,940 A  * 12/1996  Vidrascu et al. .............. 380/50
5,602,918 A  *  2/1997  Chen et al. .................... 380/25
5,757,924 A  *  5/1998  Friedman et al. ............. 380/49
5,802,320 A  *  9/1998  Baehr et al. ................. 370/355

OTHER PUBLICATIONS

Data Communications, vol. 24, No. 16, Nov. 21, 1995, pp. 71–78, 80, XP000545336, Newman D. et al.: "Can Firewalls Take the Heat?".
IEEE Communications Magazine, vol. 32, No. 9, Sep. 1, 1994, pp. 50–57, XP000476555, Bellovin S.M. et al.: "Network Firewalls".
Connexions, vol. 9, No. 7, Jul. 1, 1995, pp. 20–23, XP000564023, Ted Doty: "A Firewall Overview".

* cited by examiner

Primary Examiner—Dang Ton
Assistant Examiner—Frank Duong
(74) Attorney, Agent, or Firm—Edward J. Kondracki; Lesley L. Coulson; Miles & Stockbridge P.C.

(57) ABSTRACT

A process for protecting accesses to at least one server (30) is characterized in that it makes it possible to protect accesses originating from user stations (2) whose destination is at least one application server through a network (42) using a multisession, multiport telecommunication protocol, said process consisting of a step for the systematic establishment of a parallel security session between the user station (2) and a security processor (1) interposed between the user station to be protected during application sessions and the server or servers (30) to be protected and a step for the cyclic initiation of security sessions.

38 Claims, 4 Drawing Sheets

METHOD ENABLING SECURE ACCESS BY A STATION TO AT LEAST ONE SERVER, AND DEVICE USING SAME

BACKGROUND OF THE INVENTION

1. Field of the Invention

The present invention relates to a process for protecting a station's accesses to at least one server and a device which implements the process.

2. Description of Related Art

The need to protect the communications between servers and stations in communication networks is known, especially when these communications involve sensitive information for applications executed in the station in cooperation with the server. Up to now the protection principle consisted of adding, between the application and the layers of communication protocols in the network, part of a protection program. This program layer was installed both in the terminal and in the server. The disadvantage of such a method is that it requires a modification of the applications or the telecommunication layers and a program part for producing the interface between the protection program itself and the specific application. Thus, for each application, it is necessary to develop a specific program interface. Moreover, each server, insofar as the terminal is connected to a multiserver network, must be protected. The programming time necessary to protect each server would be a heavy burden on the budget required to protect an application.

SUMMARY OF THE INVENTION

The object of the invention is to propose a protection process which does not require any modification of the application programs executed in the terminals or any modification of the servers.

This object is achieved by the fact that the process makes it possible to protect the accesses originating from user stations whose destination is at least one application server linked through a network using a multisession, multiport telecommunication protocol, which process consists of a step for the systematic establishment of a parallel security session between the user station and a security processor interposed between the user station to be protected during application sessions and the server or servers to be protected, and a step for the cyclic initiation of security sessions.

According to another characteristic, the step for the systematic establishment of a security session includes the following steps:
- transmission by the station through the network of a source IP address and at least one port number associated with the application requested by the station;
- a search by the security processor for the security script associated with the application;
- establishment of the security session between the security processor and the station; a search by the security processor in a local file of the processor for the name and address of the remote server used for the application and the opening of a connection with the remote server by communicating an IP address and a port number.

According to another characteristic, the script associated with an application consists of directly establishing the link between the station and the remote server chosen by the security processor.

According to another characteristic, the security script to be implemented, defined in a stored table, makes it possible to choose one or more of the following functions—user authentication, identification, verification of the user's rights, certification, encryption key calculation, signature calculation, verification of user profiles—to provide selective access to the applications requested from the server.

According to another characteristic, the security processor stores a journal in a mass memory comprising a sequential connection number, the connection dates and beginning and end times, the source IP address and at least one port number, the identifier of the security object used, the name of the remote server chosen, the destination IP address and port number, and the execution rules.

According to another characteristic, the security processor stores in a second table of a memory a list of the applications processed by the processor, the operations to be executed as a function of the connection type, the security scripts to be implemented, the access rights of the users as defined by a black list, a white list and a subscriber list, and the schedules for the authorization of access to the remote servers.

Another object of the invention is to propose a device which makes it possible to implement this process.

This object is achieved by the fact that the device enables the process to be implemented between, on the one hand, a terminal in which is installed security software which manages the exchanges with the card and a card reader associated with the terminal as well as the exchanges with a multisession, multiport communications protocol, and on the other hand a security processor, characterized in that the security processor includes means for establishing and controlling communications between the station and a server chosen by the processor as a function of the application requested by the station.

According to another characteristic, the means for establishing and controlling communications make it possible either to establish direct communication between the terminal and the server, or to establish communication between the terminal and the server after establishing a security session controlled by a security device which comprises a microprocessor equipped with the memories required for its operation and which communicates with security control modules SAM which enable the security scripts to be interpreted, as determined by a main processor which executes the communication server and security engine programs.

According to another characteristic, the means for establishing communications are constituted by two local network cards such as, for example, Ethernet or token ring cards, one of which is linked to the station, while the other is linked to the server and communicates with the station and the server using the multisession, multiport communication protocol.

BRIEF DESCRIPTION OF THE DRAWINGS

Other characteristics and advantages of the present invention will become more clearly apparent with a reading of the following description, made in reference to the appended drawings, in which.

DESCRIPTION OF THE PREFERRED EMBODIMENT

Figure 1:
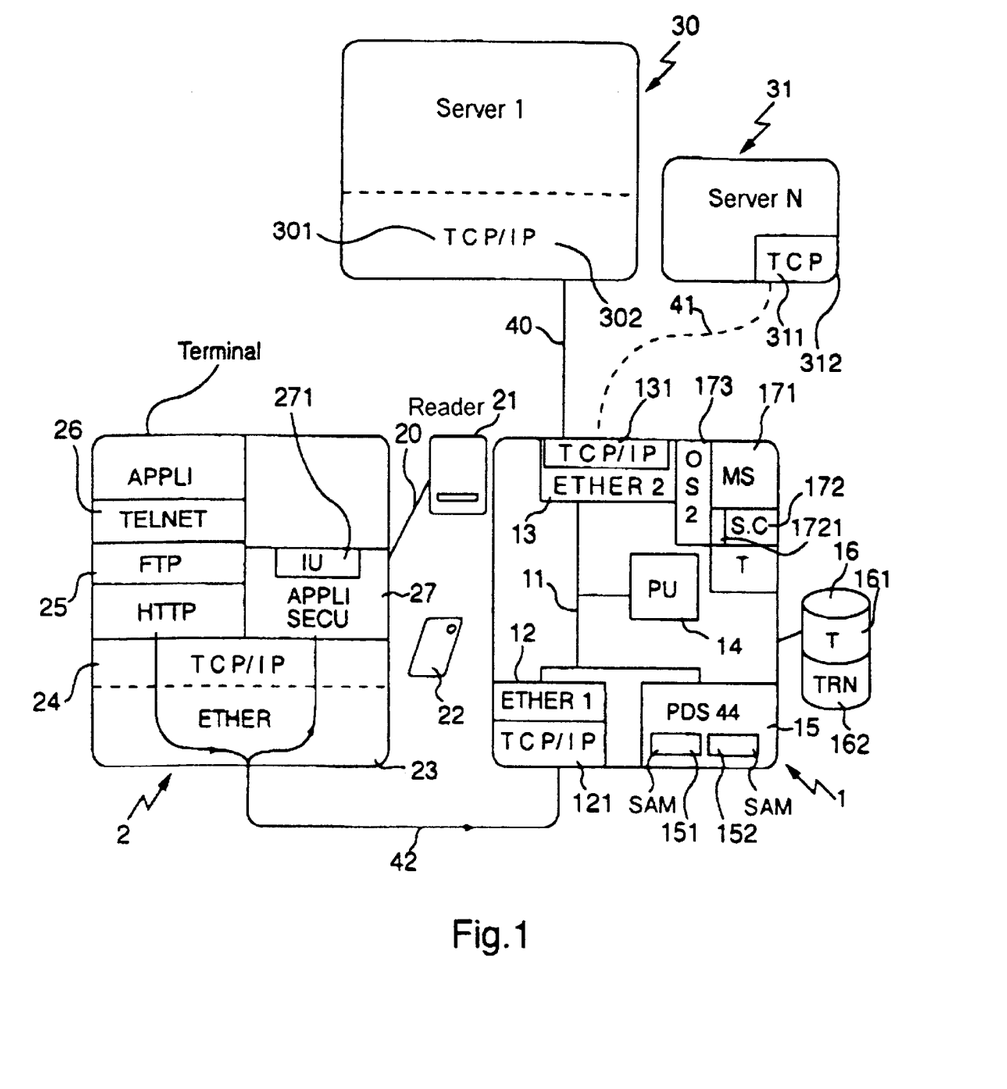
FIG. 1 represents a view of the schematic diagram of the device which implements the protection process.

The invention will now be described in connection with FIGS. 1 and 2. The invention is installed in a network constituted by terminals (2) which communicate through a network constituted by links (42, 40, 41) with one or more servers (30, 31). The terminals can either be connected locally to the network of the server or can be mobile, portable microcomputers which connect through telecommunications networks of any type—connected network, GSM, ISDN. Numerous applications run on networks of this type, such as a remote terminal application service, for example Telnet, or file transfer services such as for example FTP, or protocols used by INTERNET such as HTTP or any other application which is currently known. The network is constituted by local network cards, for example Ethernet cards (23), in the computer of the terminal which operate with a telecommunication protocol of the multisession, multiport type such as, for example, the TCP/IP protocol. Each server (30, 31) also includes an Ethernet card (302, 312) and an associated TCP/IP protocol (301, 311). To protect the network when the network includes several servers, it suffices to interpose, at the junction node of the servers located in the same enclosure as the servers, a security processor (1) which dialogues with one or more terminals (2) in the network. Each of the terminals (2) is equipped with a security application constituted by a piece of software (27) and a physical link (20) with a reader (21) of portable objects (22). These portable objects (22) can be chip cards or PC/MCIA cards.

Figure 2A:
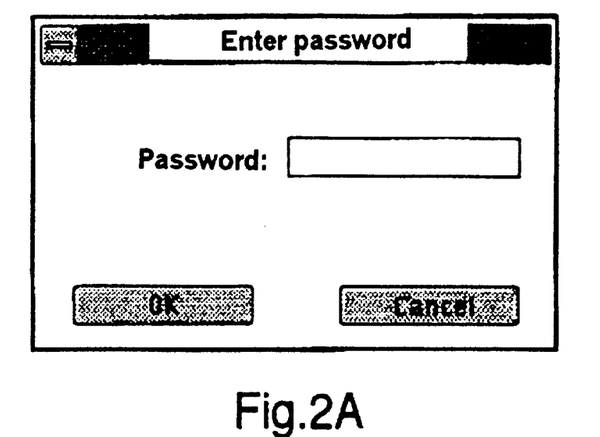
FIG. 2A represents the dialogue box managed by the security software of the terminal.
Figure 2B:
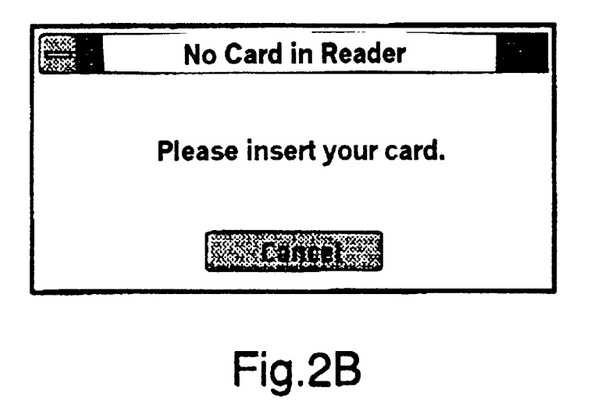
FIG. 2B represents another dialogue box which indicates the absence of any card in the reader.
Figure 2C:
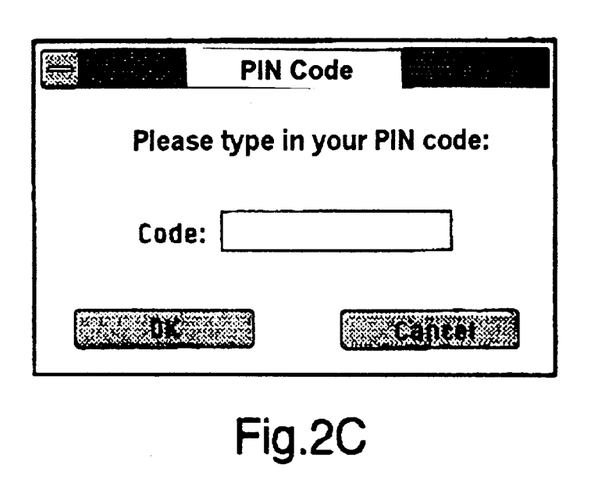
FIG. 2C represents another dialogue box requesting the user's personal identification number.
Figure 2D:
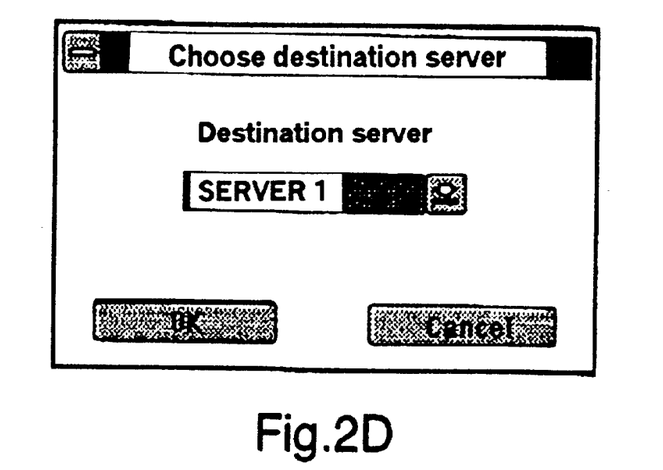
FIG. 2D represents another dialogue box which makes it possible to select the destination server.
Figure 2E:
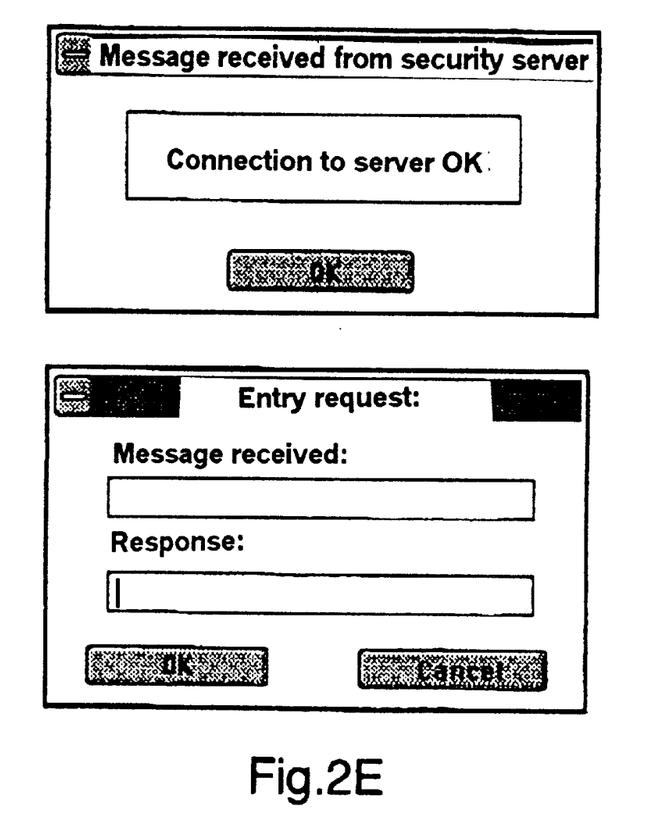
FIG. 2E represents another dialogue box which allows a character string to be entered.
Figure 2F:
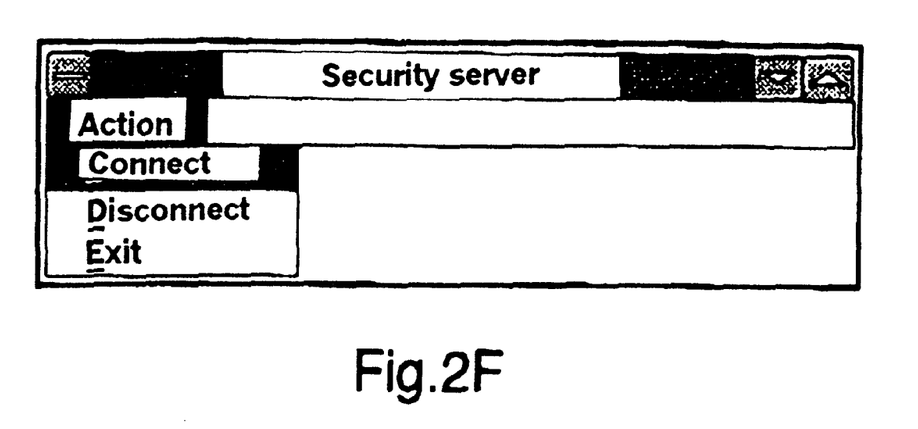
FIG. 2F represents the main window.

The security processor (1) is constituted by a central processing unit (14) comprising a PC (Personal Computer) board with the corresponding memories and communicates through a bus (11) with a first network card of the Ethernet type (13) connected to each of the servers (30, 31) by a respective link (40, 41) and with a second network card of the Ethernet type (12) connected to the terminal by a link (42). The bus (11) also communicates with a security application card (15) which comprises a processing unit, memories which are not represented, and security control modules SAM (Security Application Module) (151, 152). The installation can include n cards, each of which comprises n security control modules SAM (151, 152). These modules SAM (151, 152) make it possible to perform, in connection with the reader (21) and the portable object, security functions such as authentication, certification, encryption key calculation, etc., while ensuring the inviolability of the basic secret keys. These security functions also use the information contained in the chip card or the portable object (22) linked by the reader (21) to the security application (27) of the terminal (2). The processing unit (14) operates with a multitask operating system (173), for example of the OS2 type, in order to allow the security processor (1) to execute several tasks simultaneously. Each Ethernet card (12, 13) includes a software layer which makes it possible to implement the telecommunication protocol specific to the network, such as the TCP/IP protocol (131, 121). In addition to the operating system, the processing unit (14) operates with a communications server (172) which includes a layer (1721) for processing communications between the first card (13) and the second card (12) using the TCP/IP network protocol. The role of this communications server (172) is to determine whether the link between the second Ethernet card (12) and the first card (13) connected to the server should be made directly or if this link can only be made after the implementation of a security procedure. This determination is made by reading a file APPLI.INI stored in a memory (16) comprising a table of correspondence between the application and at least the security script to be implemented. If an implementation is required, this communications server calls a security engine (171) which triggers the operation of the security application card (15) of the security processor (1), thus enabling the security functions to be implemented. The security engine MS makes it possible to configure the security network, to define the list of applications processed by the security processor, to define the operations executed, to define the security scripts to be implemented, to define the access rights of the users and the authorization schedules. The security application (27) installed in the terminal also operates with an operating system of the window display type such as the Windows (registered trademark) software. Once the security software (27) is loaded in the station, this station, by displaying a main window (FIG. 2F) which appears after the start of the security application, enables the user of the terminal to activate the security connection, to deactivate the security connection, or to exit from the application. As shown in FIG. 2F, the selection of one of the three available functions is made by moving the highlight to the desired function then validating it with a mouse "click" or by hitting the "enter" key on the keyboard. The user connects to the protected network by indicating the IP address of the security processor (1) and the port number assigned to the application he wishes to use (for example, X for the security application, 21 for the FTP application, 23 for Telnet, etc.). The security processor (1) searches in a table for the security script associated with the port number sent by the station and then establishes a communication with the security application (27) in order to implement the security script which specifically includes the authentication of the portable user object (22) and the identification of the user through his personal identifications number (PIN). Optionally, the security processor (1) can display on the station the list of applications, with those the user is permitted to use being defined by the white lists and those not permitted being defined by the black lists. The user then selects, through actions on the keyboard or the mouse, a server-application pairing. Once the security script is running normally, the user starts the selected application (Telnet, FTP, HTTP, etc.) by validating the selection. The security processor (1) receives from the terminal (2) a port number corresponding to the application, determines from its tables the IP address of the application server and establishes the connection with the application server requested. Once the connection is established between the terminal (2) and one of the servers (30, 31), the security processor supervises the application sessions established by performing cyclic security checks in the terminal (2). If an abnormal security condition is detected (such as a card removal, an idle period, a signature miscalculation, etc.), the security processor (1) interrupts the connections with the remote server and terminates the security session.

A plurality of security scripts can be used and the choice of which script to activate is made as a function of the port number of the application indicated in the connection data. This port number and associated script information is in a file LOGON.CAM which constitutes part of a table (161) in the mass memory (16) of the security processor (1). The activation of a security connection implements a logon script which makes it possible to execute one or more of the following operations: data display and capture; source and destination IP address verification; access control by password; access control by means of a smart card which makes it possible to execute an identification of the cardholder, an authentication using a SAM security module, an encryption, a signature, a certificate calculation, a reading and writing of information, a card removal check, and the verification of the user's rights to access the remote server in the black lists, white lists, and subscriber lists, which access rights and lists constitute part of the table T (161); the verification of rights to use the various services of the TCP/IP telecommunication protocol; and the verification of the date and time slot authorized for the user or for access to the chosen machine, which authorized date and time slot is the object of a table which includes the time slots in columns and the identities of the users or machines in rows. Finally, the display of a personalized menu enables the user to choose one of the applications or remote servers he is authorized to use. The file APPLI.INI makes it possible to store in the memory (16), and to identify as a function of the application, the security script to be activated as well as the activation period, which makes it possible, in accordance with the script and the activation period chosen, to trigger the activation of a script cyclically as a function of the application of the remote server chosen. The periodic script verifies that the remote user is in fact the one who has been cleared by requesting the card in the terminal to execute electronic data (random number) signatures chosen by the script. The script is responsible for verifying, using SAM, that these signatures have been produced by a card which has the appropriate secret keys. This process makes it possible to guard against, among other things, the stealing of IP addresses by an intruding device in the network. When the user has chosen the remote server and the application, the security processor retrieves the port number of the application and uses a local file to open a connection with the remote server chosen by the security processor. This server chosen by the security processor may be different from the one indicated by the user. The user will simply receive the communications through the security processor. These communications are addressed to the station (2) via its port number. Finally, the security processor, using the security engine (171), makes it possible to hold in the mass memory (16) a journal (162) of the connections which stores a sequential connection number, the connection dates and beginning and end times, the source IP address and the port number, the identifier of the security object used, the name of the remote server chosen, the destination IP address, the port number, the volume of data exchanged between the station and the server during the application session, and the execution rule. The security application (27) comprises a presentation module (271) which makes it possible to use the window and dialogue box display system of the Windows operating system to display a first dialogue box (FIG. 2A) requesting the user to enter a password and then to validate this word or to cancel the operation, which causes the deactivation of the security connection. The user interface also makes it possible to display a second dialogue box (FIG. 2B) indicating the messages "no card in reader" and "please insert your card" as well as a third dialogue box (FIG. 2C) which enables the user to enter his personal identification number, with buttons for validating or cancelling the procedure. Finally, the fourth dialogue box makes it possible to select the destination server by allowing a selection from a scrolling list of the possible servers in the network. There are two other dialogue boxes, one of which allows the display of messages received from the security processor, while another box (FIG. 2E) makes it possible to request the entry of a character string. It is understood that the access is thereby protected, and the conditions for the access procedures can be selected by the person responsible for security, while the periodicity of the security connections prevents a hacker from connecting at a given moment by masquerading as someone else at the terminal connected to the network since if he does not have the access keys to the terminal, the security procedures do not identify him and terminate the session. Finally, this solution has the advantage of remaining transparent with respect to the protocol of the applications running on the connection. In effect, the installation of the security system is performed without modifying the applications in the terminals or even in the servers.

During the installation of the security software (27) and the security processor (1), the installer defines, in an initialization file (SERVER.INI) a security delay which allows the processor (1) to close the security connection established with a client station if there has been no application connection since the predetermined delay, and an inactivity delay which allows the processor to close the security connection and the application connections established with a client station if there have been no data exchanges in the application connections since the predetermined delay.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for protecting accesses, through a network, to at least one application server, an access originating from a user station, using a multisession, multiport telecommunication protocol to establish an application session between the user station and an application server, said process comprising the steps of:

interposing a security processor between the user station and the application server;

transmitting, from the user station towards the application server, an access request for establishing an application session with the application server;

establishing, between the user station and the security processor, a security session for running in parallel with the requested application session;

defining a security script for the parallel security session among a plurality of scripts;

providing the user station with access to the application server, under the control of the security processor running the parallel security session and using the defined security script, for establishing the requested application session in parallel with the security session; and cyclically initiating security sessions as security checks on the application session.

2. The process for protecting accesses to at least one application server according to claim 1, wherein the step of establishing a security session comprises:

transmitting by the user station through the network a source IP address and at least one port number associated with the application requested by the user station;

searching by the security processor for a security script associated with the requested application;

establishing the security session between the security processor and the user station;

searching by the security processor in a local file of the processor for a name and address of a at least one remote server used for the requested application and choosing a remote server from the at least one remote servers found; and opening a connection with the chosen remote server by communicating an IP address and a port number.

3. The process for protecting accesses to at least one application server according to claim 2, wherein the security script associated with the requested application comprises directly establishing a link between the user station and the remote server chosen by the security processor.

4. The process for protecting accesses to at least one application server according to claim 1, wherein the defined security script stored in a table, makes possible a step of selecting at least one function from a group of security functions comprising user authentication, user identification, verification of user rights, certification, encryption key calculation, signature calculation, and verification of user profiles, wherein said at least one selected function provides selective access to the requested application session.

5. The process for protecting accesses to at least one application server according to claim 2, wherein the security processor stores a journal in a memory comprising at least two information elements selected from the group comprising sequential connection number, connection dates and beginning and end times, the source IP address and the at least one port number, an identifier of a security object user, name of the remote server chosen, the IP address and the port number, and execution rules.

6. The process for protecting accesses to at least one application server according to claim 2, wherein the security processor stores in a table of a memory a list of at least three information elements selected from the group comprising a list of applications processed by the processor, operations to be executed as a function of connection type, the plurality of security scripts, access rights of users as defined by a black list, a white list and a subscriber list, and schedules for authorizing access to remote servers.

7. The process for protecting accesses to at least one application server according to claim 3, wherein the security processor stores a journal in a memory comprising at least two information elements selected from the group comprising sequential connection number, connection dates and beginning and end times, the source IP address and the at least one port number, an identifier of a security object used, name of the remote server chosen, the destination IP address and the port number, and execution rules.

8. The process for protecting accesses to at least one application server according to claim 4, wherein the security processor stores a journal in a memory comprising at least two information elements selected from the group comprising sequential connection number, connection dates and beginning and end times, the source IP address and the at least one port number, an identifier of a security object used, name of the remote server chosen, the IP address and the port number, and execution rules.

9. The process for protecting accesses to at least one application server according to claim 3, wherein the security processor stores in a second table of a memory a list of at least three information elements selected from a group comprising a list of applications processed by the processor, operations to be executed as a function of connection type, the plurality of security scripts, access rights of users as defined by a black list, a white list and a subscriber list, and schedules for authorizing access to remote servers.

10. The process for protecting accesses to at least one application server according to claim 4, wherein the security processor stores in a second table of a memory a list of at least three information elements selected from the group comprising a list of applications processed by the processor, operations to be executed as a function of connection type, the plurality of security scripts, access rights of users as defined by a black list, a white list and a subscriber list, and schedules for authorizing access to remote servers.

11. The process for protecting accesses to at least one application server according to claim 5, wherein the security processor stores in a second table of a memory a list of at least three information elements selected from the group comprising a list of applications processed by the processor, operations to be executed as a function of connection type, the plurality of security scripts, access rights of users as defined by a black list, a white list and a subscriber list, and schedules for authorizing access to remote servers.

12. The process for protecting accesses to at least one application server according claim 3, additionally comprising the step of installing security software in the security processor, wherein an installer defines, in an initialization file a security delay which allows the security processor to close a security connection established with the user station if there has been no application connection since the defined security delay, and an inactivity delay which allows the processor to close the security connection and an application connection established with the user station if there have been no data exchanges in the application connection since the defined inactivity delay.

13. The process for protecting accesses to at least one application server according claim 4, further comprising installing security software in the security processor, wherein an installer defines, in an initialization file a security delay which allows the security processor to close a security connection established with the user station if there has been no application connection since the defined security delay, and an inactivity delay which allows the processor to close the security connection and an application connection established with a the user station if there have been no data exchanges in the application connection since the defined inactivity delay.

14. The process for protecting accesses to at least one application server according claim 5, further comprising installing security software in the security processor, wherein an installer defines, in an initialization file a security delay which allows the security processor to close a security connection established with the user station if there has been no application connection since the defined security delay, and an inactivity delay which allows the processor to close the security connection and an application connection established with the user station if there have been no data exchanges in the application connection since the defined inactivity delay.

15. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts;

wherein the step of systematically establishing a security session comprises:

transmitting by the station through the network of a source IP address and at least one port number associated with the application requested by the station;

searching by the security processor for the security script associated with the application;

establishing the security session between the security processor and the station;

searching by the security processor in a local file of the processor for the name and address of a remote server used for the application; and opening a connection with the at least one remote server by communicating an IP address and a port number, wherein the security processor stores in a second table of a memory a list of at least three information elements including the applications processed by the processor, the operations to be executed as a function of the connection type, the security scripts to be implemented, the access rights of the users as defined by a black list, a white list and a subscriber list, and the schedules for the authorization of access to the remote servers.

16. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts, wherein the security script associated with an application comprises the step of directly establishing the link between the station and the remote server chosen by the security processor.

17. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts;

wherein the step of systematically establishing a security session comprises:

transmitting by the station through the network of a source IP address and at least one port number associated with the application requested by the station;

searching by the security processor for the security script associated with the application;

establishing the security session between the security processor and the station;

searching by the security processor in a local file of the processor for the name and address of a remote server used for the application; and opening a connection with the at least one remote server by communicating an IP address and a port number, wherein the security script to be implemented, defined in a stored table, makes possible a choice of at least one security function selected from a group of security functions including user authentication, user identification, verification of the user's rights, certification, encryption key calculation, signature calculation, verification of user profiles, said at least one security function to provide selective access to applications requested from the server.

18. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts;

wherein the step of systematically establishing a security session comprises:

transmitting by the station through the network of a source IP address and at least one port number associated with the application requested by the station;

searching by the security processor for the security script associated with the application;

establishing the security session between the security processor and the station;

searching by the security processor in a local file of the processor for the name and address of a remote server used for the application; and opening a connection with the at least one remote server by communicating an IP address and a port number, wherein the security processor stores a journal in a memory comprising at least two information elements including a sequential connection number, the connection dates and beginning and end times, the source IP address and at least one port number, the identifier of the security object used, the name of the remote server chosen, the destination IP address and port number, and the execution rules.

19. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts, wherein the security script to be implemented, defined in a stored table, makes possible the step of selecting at least one function from a group of security functions including data display and capture, source and destination IP address verification, access control by password, and access control by a smart card, wherein said access control makes possible execution of an identification of a cardholder.

20. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts;

wherein the step of systematically establishing a security session comprises:

transmitting by the station through the network of a source IP address and at least one port number associated with the application requested by the station;

searching by the security processor for the security script associated with the application;

establishing the security session between the security processor and the station;

searching by the security processor in a local file of the processor for the name and address of a remote server used for the application and;

opening a connection with the at least one remote server by communicating an IP address and a port number, wherein the security script to be implemented, defined in a stored table, makes possible the step of selecting at least one function from a group of security functions including data display and capture, source and destination IP address verification, access control by password, and access control by a smart card, wherein said access control makes possible execution of an identification of a cardholder.

21. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server;

cyclically initiating security sessions, wherein a security script of the parallel security session is defined among a plurality of scripts; and installing security software in the security processor, wherein an installer defines, in an initialization file a security delay which allows the security processor to close a security connection established with a client station if there has been no application connection since the defined security delay, and an inactivity delay which allows the processor to close the security connection and the application connections established with a client station if there have been no data exchanges in the application connections since the defined inactivity delay.

22. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server; and cyclically initiating security sessions, wherein a security script of the parallel security session is defined among a plurality of scripts;

wherein the step of systematically establishing a security session comprises the following steps:

transmitting by the station through the network of a source IP address and at least one port number associated with the application requested by the station;

searching by the security processor for the security script associated with the application;

establishing the security session between the security processor and the station;

searching by the security processor in a local file of the processor for the name and address of a remote server used for the application;

opening a connection with the at least one remote server by communicating an IP address and a port number; and installing security software in the security processor, wherein an installer defines, in an initialization file a security delay which allows the security processor to close a security connection established with a client station if there has been no application connection since the defined security delay, and an inactivity delay which allows the processor to close the security connection and the application connections established with a client station if there have been no data exchanges in the application connections since the defined inactivity delay.

23. A process for protecting accesses originating from a user station whose destination is at least one application server through a network using a multisession, multiport telecommunication protocol, said process comprising:

systematically establishing a parallel security session between the user station and a security processor interposed between the user station to be protected during application sessions and the at least one application server;

cyclically initiating security sessions, wherein a security script of the parallel security session is defined among a plurality of scripts, wherein the security processor stores in a second table of a memory a list of at least three information elements including the applications processed by the processor, the operations to be executed as a function of the connection type, the security scripts to be implemented, the access rights of the users as defined by a black list, a white list and a subscriber list, and the schedules for the authorization of access to the remote servers; and installing security software in the security processor, wherein an installer defines, in an initialization file a security delay which allows the security processor to close a security connection established with a client station if there has been no application connection since the defined security delay, and an inactivity delay which allows the processor to close the security connection and the application connections established with a client station if there have been no data exchanges in the application connections since the defined inactivity delay.

24. Equipment which enables a process for protecting accesses to at least one application server through a network, resulting from access requests for an application session originating from a user station, using a multisession, multiport telecommunication protocol, said equipment comprising:

a user station having security software for managing data exchanges with at least one portable object and at least one portable object reader associated with the user station, and data exchanges with a security processor using a multisession, multiport communication protocol; and a security processor, comprising a communications controller arranged for controlling a communications establishing device, said security processor being arranged for running, in parallel, two communications sessions with the user station, a first session of said two sessions being a security session used by the communications controller to control a second session of said two sessions, the second session being an application session established by the communications establishing device.

25. Equipment according to claim 24, wherein the communications establishing device and the communications controller comprise one of a first establishing device for establishing direct communication between the user station and the at least one application server and a second establishing device for establishing communication between the user station and the at least one application server after a security session controlled by a security device is established, said security device comprising a microprocessor equipped with memory required for its operation and which communicates with security control modules SAM which enables security scripts to be interpreted, as determined by a main processor which executes communication server programs and security engine programs.

26. Equipment according to claim 25, wherein during installation of the security software in the security processor, an installer defines, in an initialization file, a security delay which allows the security processor to close a security connection established with the user station if there has been no application connection since the defined security delay, and an inactivity delay which allows the processor to close the security connection and an application connection established with the user station if there have been no data exchanges in the application connection since the defined inactivity delay.

27. Equipment according to claim 25, wherein the communications establishing device includes two telecommunication cards, a first card linked to the user station, a second card linked to at least one server, said communications establishing device being arranged to communicate with the user station and a server using the multisession, multiport communication protocol.

28. Equipment according to claim 25, further comprising a mechanism, said mechanism configured for defining, among a plurality of scripts, a script for the security session, and a mechanism for cyclically performing said security session.

29. Equipment according to claim 24, wherein the communications establishing device is comprised of two telecommunication cards, a first card linked to the user station, a second card linked to at least one application server, said communications establishing device being arranged to communicate with the user station and the server using the multisession, multiport communication protocol.

30. Equipment according to claim 28, wherein the mechanism configured for defining a script comprises a table of correspondence between the requested application and at least the defined security script.

31. The device according to claim 30, wherein the security script to be implemented executes at least one operation selected from a group of operations including data display and capture source and destination IP address verification; access control by password; access control by means of a smart card for executing an identification of the cardholder, an authentication using a SAM security module, an encryption, a signature, a certificate calculation, a reading and writing of information, a card removal check, and verification of a user's rights to access a remote server in black lists, white lists, and subscriber lists; verification of rights to use various services of the TCP/IP telecommunication protocol; and verification of date and time slot authorized for the user or for access to a chosen machine.

32. Equipment according to claim 31, wherein the access rights and lists constitute part of a table saved in a mass memory of the security process.

33. Equipment according to claim 31, wherein authorized date and time slot for a user are stored in a table which includes time slots in columns and identities of users or user stations in rows.

34. Equipment according to claim 30, wherein the plurality of security scripts is chosen as a function of a port number of the requested application, wherein said port number and associated script information is stored in a file which constitutes part of the table in the mass memory of the security processor.

35. Equipment according to claim 34, wherein the defined security script comprises a verification mechanism configured to periodically verify that a user of the user station has been cleared by requesting a card in the user station to execute electronic data (random number) signatures chosen by the defined security script.

36. Equipment according to claim 29, further comprising a mechanism, said mechanism configured for defining, among a plurality of scripts, a script of the security session, and a mechanism for cyclically performing said security session.

37. Equipment according to claim 24, wherein the communications controller comprises a security engine which triggers operation of a security application card of the security processor, enabling security functions to be implemented, the security engine making it possible to configure the security network, to define a list of applications processed by the security processor, to define operations executed, to define the plurality of security scripts, and to define access rights of users and authorization schedules.

38. The device according to claim 24, wherein the security processor is arranged for choosing the application server as a function of an application requested by the user station.

* * * * *